United States Patent Office 2,786,833
Patented Mar. 26, 1957

2,786,833

SULFATION OF AMYLACEOUS MATERIALS

Otto B. Wurzburg, Plainfield, and Morton W. Rutenberg, North Plainfield, N. J., and Lawrence J. Ross, Monroe, N. Y., assignors to National Starch Products Inc., New York, N. Y., a corporation of Delaware No Drawing. Application November 24, 1953,
Serial No. 394,236

9 Claims. (Cl. 260—233.5)

The object of this invention is to produce a new class of amylaceous derivatives, characterized by valuable physical and chemical properties. Another object is to devise a commercially efficient, feasible and economical method for the production of these derivatives. More particularly, this invention deals with a process for the sulfation of starches, resulting in new products of notable interest for a wide range of industrial applications.

The sulfation of starch introduces into the starch molecule the sulfate group, which is hydrophilic, as well as acidic. The effect of the introduction of this group naturally varies to some extent, depending upon the particular starch type being treated, and the amount of substitution. One of the most remarkable improvements lies in the increased stability and clarity of the aqueous dispersions of the derivatives. Thus, if ordinary corn starch, or even an acid-converted corn starch, is cooked in water, the resulting dispersion will upon cooling set to an opaque gel. Other starch types exhibit this lack of stability to a lesser extent, but there usually is a thickening and/or a loss of clarity of the dispersions of such materials upon standing. This viscosity instability and loss of clarity is a marked disadvantage for many industrial applications. Amylaceous materials treated according to the process of our invention are characterized by greatly improved stability and clarity of their aqueous dispersions, as compared to the corresponding untreated bases. The industrial importance of this property will be touched upon subsequently.

The introduction of the hydrophilic sulfate groups also leads to increased water solubility. Thus, by introduction of a sufficiently high proportion of the sulfate groups, it is possible to produce a cold water soluble starch.

In the textile industry, the products of our invention have various uses. In the sizing and finishing of fabrics with starches, the stability of the cooked gel is of the utmost importance. Any substantial thickening of the starch sol during the sizing process reduces the desired penetration of the starch into the fabrics, and alters the amount of starch taken up by the fabric. Thus, the efficiency of the sizing operation is directly dependent upon the viscosity-stability of the starch size. The viscosity-stability of our materials makes them particularly interesting as textile sizes and finishes. These starches are also of particular interest as thickeners in textile printing gums and other industrial fields.

In the formulation of industrial adhesives, the stability of our starch derivatives is of real value. In paper manufacturing and processing, the derivatives find use as beater sizes and coating materials.

The presence of the added hydrophilic sulfate groups in our products offers the possibility of subsequent reactions with polyvalent metallic irons, and consequent further alterations of their properties.

In the term "amylaceous materials" or "starches" we include all polysaccharides of an amylaceous or starchy nature. This includes starches of any source, including corn, wheat, tapioca, waxy maize, sago, potato, sweet potato and rice. The starch may be in its native, unconverted state, or it may have been converted by heat, acids, oxidizing agents or other chemical means to thin-boiling starch, dextrin, starch ethers or esters or other derivatives, so long as the polysaccharide structure is still retained. It will be understood that when we refer in this specification to an "amylaceous material" or to a "starch" we mean to include all of the above-listed types. The particular amylaceous type chosen for processing will of course depend not only upon availability and economics but also upon the use to which the processed polysaccharide is to be put, and the particular properties desired for that use.

According to our invention, a starch is treated with a reagent comprising the addition product of sulfur trioxide and a tertiary amine. We prefer that the tertiary amine be one having a base strength as indicated by the dissociation constant of approximately $10^{-9}$ or greater. It is believed that the use of tertiary amines having dissociation constants substantially less than $10^{-9}$ (i. e., $10^{-11}$, $10^{-12}$, etc.) does not result in products which are as effective in modifying aqueous suspensions or dispersions of starches. The tertiary amine may be aliphatic, heterocyclic, aromatic or aryl aliphatic; and where it is aromatic, it is desirable that it should not be one where the nitrogen is bonded to the nucleus of the aryl group (as in the anilines). It is believed that the reaction between sulfur trioxide and a tertiary amine results in an addition product which may be described as an internal salt of a tri-substituted sulfamic acid. Some such products may be commercially available and methods of making others will be described below.

For purposes of brevity we shall hereafter refer to the above-described addition product of the teritary amine and sulfur trioxide as the "reagent."

The reagent may be prepared by mixing the suitable tertiary amine with the sulfur trioxide. Actual examples of the preparation of the addition products are described below (Examples A and B), although other methods are also feasible.

*Example A.*—We dissolved 16.7 grams of gaseous trimethylamine in 190 ml. of chloroform. Maintaining anhydrous reaction conditions, 12 ml. of liquid sulfur trioxide were slowly added to the above solution, with constant agitation, keeping the temperature within the range 15–20° C. by cooling. The addition product of trimethylamine and sulfur trioxide precipitated as a finely divided white mass, which was filtered and dried in vacuo. The crystals had a melting point of 240° C. This melting point correspond exactly with that reported in the J. Am. Chem. Soc., 65, p. 1632 (1943).

*Example B.*—Under anhydrous conditions we slowly added 70 ml. liquid sulphur trioxide to a solution of 235 ml. of triethylamine (B. P. 88.5–89.5° C.) in 1400 ml. of carbon tetrachloride, with constant agitation and cooling, maintaining the temperature at 15–17° C. The product separated as an orange colored mass, which could be isolated by filtering and purified by successive washings with cold water (this purification by washing is not always essential for the purposes of our invention and may result in a certain amount of the reagent being lost). The recrystallized product melted at 91.5° C. This conformed with the value reported in the J. Am. Chem. Soc., 71, p. 852 (1949).

Instead of reacting the tertiary amine directly with sulfur trioxide, one may achieve the same result by reacting the amine with a reagent acting as a donor of $SO_3$ (for example, chlorsulfonic acid). Still another method is indicated in U. S. Patent No. 2,386,693 where the addition product of trimethylamine and sulfur trioxide is made by the reaction of dimethyl sulfate and tetramethyl sulfamide.

The tertiary amine-sulfur trioxide addition products vary considerably among themselves as to solubility, stability and reactivity and the practitioner will keep these variations in mind in determining his precise reaction conditions.

Other reagents suitable for our process, besides those already mentioned, include the addition products of sulfur trioxide with tributylamine, tripropylamine, N-ethyl morpholine, N-methyl morpholine, dimethyl benzylamine, diethyl benzylamine, methyl diethylamine and pyridine. All of the above-mentioned reagents are characterized by being addition compounds of sulfur trioxide with a tertiary amine having a dissociation constant in the order of $10^{-9}$ or higher.

According to our process, the reaction between the starch and the addition product must take place in the presence of water. Thus, the starch may be suspended or dispersed in water during the reaction. From the point of view of operating economy and efficiency, this is a most important advantage, as compared to those previous methods which required anhydrous conditions and/or the use of organic liquid media. It should be noted that our process may also be carried out upon dry starches, if so desired, so long as the reaction mass (i. e., starch and reagent, plus alkali or other additives) contains at least 10% water, based on the weight of the anhydrous starch. This water may be present in the reaction mass in the form of the moisture ordinarily present in so-called commercially dry starch, or the water may be added separately to the reaction mass, or as a part of one or more of the components of the reaction mass (e. g., the water in the aqueous alkali solution, or the like). It will be seen that this permits the use even of an anhydrous starch, so long as at least 10% water is added to the reaction mass.

Another essential of our process is that the reaction between the starch and the reagent take place in the presence of added alkali, the pH of the reaction mass being at least 9. This alkali may comprise the hydroxide or weak acid salt of an alkali metal (including alkaline earth metals) or a quaternary hydroxide. Thus, one may employ sodium hydroxide, potassium hydroxide, calcium hydroxide, trisodium phosphate, sodium carbonate, quaternary ammonium hydroxide or the like.

When the reaction takes place in aqueous suspension, dispersion or solution, the alkali may of course be dissolved in the water. When dealing with commercially dry materials, the alkali may be blended in powdered form with the polysaccharide, or it may be sprayed in the form of a solution into the dry mixture of polysaccharide and reagent. In another variation of this procedure, the starch is pretreated by suspension in an aqueous solution of alkali. The alkali-starch may then be treated with the reagent, without the necessity of adding further alkali. Other variations are possible, within the scope and spirit of our invention, but they are all characterized by having an ultimate mixture of starch, reagent, moisture and added alkali.

The reaction may be carried out at room temperature, although heat may be applied if desired. Heating the mixture ordinarily speeds the reaction, as it does in most chemical reactions. When carrying out the reaction upon commercially dry starch the use of heat is particularly desirable.

One may begin the reaction with an ungelatinized starch, and by avoiding gelatinization conditions (i. e. excessive heat or alkali) or by adding a gelatinization retarder such as sodium sulphate, obtain the final sulfated starch in the form of the original, ungelatinized starch granules. Or one may deliberately apply gelatinization conditions, if it is desired to obtain the sulfated starch in the form of a gelatinized product. One may of course begin with a gelatinized starch dispersion in water, adding alkali and reagent. The gelatinized, sulfated starch dispersion may be used as such, or the starch derivative may be precipitated by pouring into alcohol, or other suitable precipitant, or the starch derivative may be dried over heated drums or by any other convenient means.

We believe that the reaction product of the starch and the reagent is a starch mono-ester (i. e., starch monosulfate) in which the residual hydrogen may be present, or in which the residual hydrogen may have been replaced by an amine group or by an alkali metal or quaternary group, or a combination of one or more of these forms may exist simultaneously.

The proportion of reagent that may be reacted with the polysaccharide varies over a wide range. Thus we have obtained notably improved products using as little as 0.1% by weight of the reagent, based on the starch, and have also successfully employed quantities of reagent in the order of 450%.

The following examples will further illustrate the embodiment of our invention. All parts given are by weight.

Example I

One hundred parts of an acid converted corn starch, converted to a degree known in the trade as 40 fluidity, were suspended in 125 parts of water, with constant agitation. There was then added 33⅓ parts of a 3% aqueous sodium hydroxide solution, followed by addition of 0.1 part of triethylamine-sulfur trioxide addition product. Agitation was maintained for 16–24 hours, at room temperature, and the suspension was then neutralized with dilute hydrochloric acid to pH 6–7. The starch derivative was filtered, washed and dried.

When a sample of the starch derivative of this example was suspended in water (the suspension containing 12% starch solids), cooked to produce a gelatinized dispersion and cooled overnight, the result was a substantially softer, clearer gel, as compared to a similarly cooked sample of the untreated fluidity starch.

Example II

Example I was repeated, except that in place of the corn fluidity starch we used unconverted corn starch, and we used 4 parts of the triethylamine-sulfur trioxide addition compound instead of 0.1 part. When the resulting product was cooked in 15 parts of water at 195° F. it produced a heavier and clearer sol than was produced by the untreated corn starch. After cooking and standing overnight, our treated product was still a heavy, clear, stable sol, whereas the cooked untreated starch had set to an opaque, rigid gel.

Example III

Example I was repeated, using 2 parts of the triethylaminesulfur trioxide addition compound, and using 7% of trisodium phosphate as the alkaline material instead of the 1% of sodium hydroxide. In other variations of this example, we used as the alkaline material sodium carbonate and potassium carbonate. In all cases, the resulting products, when cooked in water, were characterized by notably increased clarity and stability.

Example IV

In this example we used a corn starch which had been previously modified by treating an aqueous suspension of the starch with 0.1% epichlorohydrin and 0.8% sodium hydroxide, based on the dry starch weight, agitating overnight, neutralizing with dilute hydrochloric acid, filtering, washing and drying. The resulting product was a slightly inhibited starch; that is, the tendency toward rupture and dispersion of the starch granules under normal gelatinization conditions was retarded. One hundred parts of the thus modified starch were added with rapid agitation to 150 parts water containing dissolved therein 1 part of sodium hydroxide. When a uniform suspension had been obtained, we added 2 parts of the triethylamine-sulfur trioxide addition product. Agitation was maintained overnight, whereupon sufficient dilute hydrochloric acid was added to bring the pH to approximately 7, and the starch was filtered, washed and dried. The resulting product, when cooked in water, produced a sol that was much heavier, yet clearer and more stable than sols produced by either the raw starch or the inhibited starch with the same amount of water.

Example V

Various modifications of Example II were run. In one case, instead of the untreated corn starch we used a corn starch which had been oxidized with sodium hypochlorite to a degree of conversion known in the trade as 85 fluidity. In other variations we used waxy maize starch, sago starch and tapioca starch, as well as starches derived from wheat, rice and sorghum. In all cases the resulting products were characterized by improved stability and clarity, although the effect was most pronounced in the case of the naturally less stable starches, such as corn, wheat, rice and sorghum.

Example VI

Example II was repeated, using as the reagent N-methyl morpholine-sulfurtrioxide addition product, instead of triethylamine-sulfur trioxide. The resulting product showed improved characteristics approaching those of Example II.

Example VII

This example illustrates the use of higher proportions of reagent. Ninety-nine parts of triethylamine-sulfur trioxide addition product were suspended in 400 parts of water, to which there were added 100 parts of untreated corn starch. With continuous agitation, 90 parts of a 2% aqueous solution of sodium hydroxide were added. After 16 hours agitation, the reaction mass was poured into a large excess of ethanol, in order to precipitate the starch sulfate. The starch was filtered, washed repeatedly with ethanol, and finally with ethanol which had been acidulated with hydrochloric acid, until the starch indicated a pH of about 7 when dispersed in water. The material was vacuum dried and ground.

The resultant product dissolved readily in cold water, in the ratio 1 starch: 10 water, to give a clear, stable solution which showed no perceptible loss of clarity upon standing.

Example VIII

A solution was made of 40 parts of sodium sulfate and 2 parts of sodium hydroxide in 150 parts of water. There were rapidly added 100 parts of a corn starch which had been acid-converted to a degree known in the trade as 40 fluidity. The suspension was agitated continuously, and when uniform we added 8 parts of tributylamine-sulfur trioxide addition product. Agitation was continued overnight, at 110° F., and the starch was then filtered, washed with water and dried. The resultant product, when cooked in water and cooled, formed a sol that was somewhat more stable against gelling and loss of clarity than one formed from the corresponding untreated fluidity starch.

Example IX

This example illustrates a variation of our process, wherein starch is treated in aqueous suspension with the reagent, and is then dried, followed by treatment of this commercially dry starch with alkali.

Fifty parts of corn starch were suspended in 70 parts of cold water (approx. 10° C.), and 40 parts of triethylamine-sulfur trioxide addition product were added. After a short period of agitation, the starch was filtered, dried and ground to a fine powder. The starch was placed in a dry blending vessel equipped with heating facilities (as for example a commercial dextrinizer), and while the starch was agitated there were spryed into it 20 parts of a 50% aqueous sodium hydroxide solution. Agitating continuously, the mixture was heated at 115° F. for about 4 hours, or until a spot sample after washing with acidified ethyl alcohol and neutralizing to pH 8 swelled and dispersed in cold water. The dry starch product was cooled, and excess alkalinity was removed, if desired, by washing with acidified ethyl alcohol or by passage of acetic acid vapors over the starch. As indicated above, a cold water dispersible product resulted.

Example X

As pointed out previously the reaction of our invention may be utilized in combination with other chemical modifications of starches, in order to obtain desired combinations of properties. Thus, we repeated Example II, using in place of the untreated starch a corn starch which had been previously acetylated so as to contain from 1.0 to 1.5% acetyl groups. One method of acetylation is described in U. S. Patent No. 2,461,139, although the particular method of acetylation is not critical for the present invention. The resulting product, while characterized by the properties of an acetylated starch, produced a clearer and more stable sol when cooked in water and cooled, as compared to the non-sulfated acetylated starch.

Example XI

This example illustrates the use of very high proportions of reagent. Twenty parts of corn starch were suspended in 60 parts of water. The pH of the suspension was adjusted to 11–12 by the addition of dilute sodium hydroxide solution, and there were added, with constant agitation, 90 parts of triethylamine-sulfur trioxide addition product. The reaction mixture was agitated for 48 hours, maintaining the pH during this period between 11 and 12. The resulting product was improved in the manner already noted.

Example XII

One part of sodium hydroxide was dissolved in 150 parts of water at room temperature. To this solution was added 100 parts of a corn starch which had been acid-converted to a degree known in the trade as 40 fluidity. Four parts of pyridine-sulfur trioxide addition product were then added, with agitation. The slurry was agitated at room temperature (65–75° F.) overnight. It gradually thickened, forming an opaque viscous paste. This paste was suspended in 300 parts of anhydrous ethanol, adjusted to pH 5 with dilute hydrochloric acid, filtered, washed with ethanol and air-dried. The resulting product when cooked in water gave a sol that was substantially more stable than that of the untreated fluidity starch.

Although we have indicated in the examples methods of treating starch or starch derivatives directly, it should be understood that the reaction herein described may be carried out in conjunction with other reactions upon the starch. Thus, the reagent may be added to the starch or starch derivatives together with such other materials as may be desired for the formulation of adhesives, coatings and the like. If desired, the reagent, with alkali, may be added to an aqueous starch suspension which may thereupon be passed over heated revolving drums, resulting in a gelatinized, cold water soluble, sulfated starch.

Summarizing, our process is unique in that it permits the sulfation of starch and its derivatives in a simple, economical and efficient manner. The commercial feasibility of our process is due mainly to the fact that it is carried out in water suspension or at least in the presence of quantities of water equivalent to those ordinarily present in commercially dry starch. In the past most methods for sulfating polysaccharides involved the use of inert organic solvents and/or anhydrous reaction conditions. Previous types of sulfation, if run in the presence of moisture, resulted in extensive degradation of starch due mainly to the highly acid reaction conditions. Also the use of organic reaction media obviously complicated the process considerably, involving such problems as flammability, toxic vapors, recovery of solvent and, of course, substantial increase in expense. Organic solvents and diluents are entirely unnecessary for our process. Our process represents the first case where polysaccharides, and more particularly the acid sensitive types such as starch may be sulfated in the presence of water ranging from a few percent, up to several hundred percent based on the polysaccharide content, without marked degradation.

We claim:

1. The method of sulfation of an amylaceous material which comprises mixing an amylaceous material in the presence of water and an alkali selected from the class consisting of the alkali metal hydroxides, the weak acid salts of alkali metals and quaternary hydroxides, with a reagent for effecting the sulfation comprising the separate addition product of sulphur trioxide and a tertiary amine.

2. The method of sulfation of an amylaceous material which comprises mixing an aqueous suspension of an amylaceous material in the presence of water and an alkali selected from the class consisting of the alkali metal hydroxides, the weak acid salts of alkali metals and quaternary hydroxides, with a reagent for effecting the sulfation comprising the separate addition product of sulphur trioxide and a tertiary amine.

3. The method of sulfation of an amylaceous material which comprises mixing an amylaceous material in the presence of water and an alkali selected from the class consisting of the alkali metal hydroxides, the weak acid salts of alkali metals and quaternary hydroxides, with a reagent for effecting the sulfation comprising the separate addition product of sulphur trioxide and a tertiary amine having a base strength as indicated by a dissociation constant of at least $10^{-9}$ approximately.

4. The method of claim 1 in which the tertiary amine is triethylamine.

5. The method of claim 1 in which the tertiary amine is trimethylamine.

6. The method of claim 1 in which the tertiary amine is tripropylamine.

7. The method of claim 1 in which the tertiary amine is tributylamine.

8. The method of claim 1 in which the reaction is carried on by agitation and with heat.

9. The method of sulfation of an amylaceous material which comprises mixing an amylaceous material in the presence of water and an alkali selected from the class consisting of the alkali metal hydroxides, the weak acid salts of alkali metals and quaternary hydroxides, with a reagent for effecting the sulfation comprising the separate addition product of sulphur trioxide and a tertiary amine, and then neutralizing the reacted product.

References Cited in the file of this patent

UNITED STATES PATENTS

| | | |
|---|---|---|
| 2,686,779 | Jones | Aug. 17, 1954 |
| 2,697,093 | Jones | Dec. 14, 1954 |

FOREIGN PATENTS

| | | |
|---|---|---|
| 603,571 | Great Britain | June 18, 1948 |